United States Patent Office 3,335,738
Patented Aug. 15, 1967

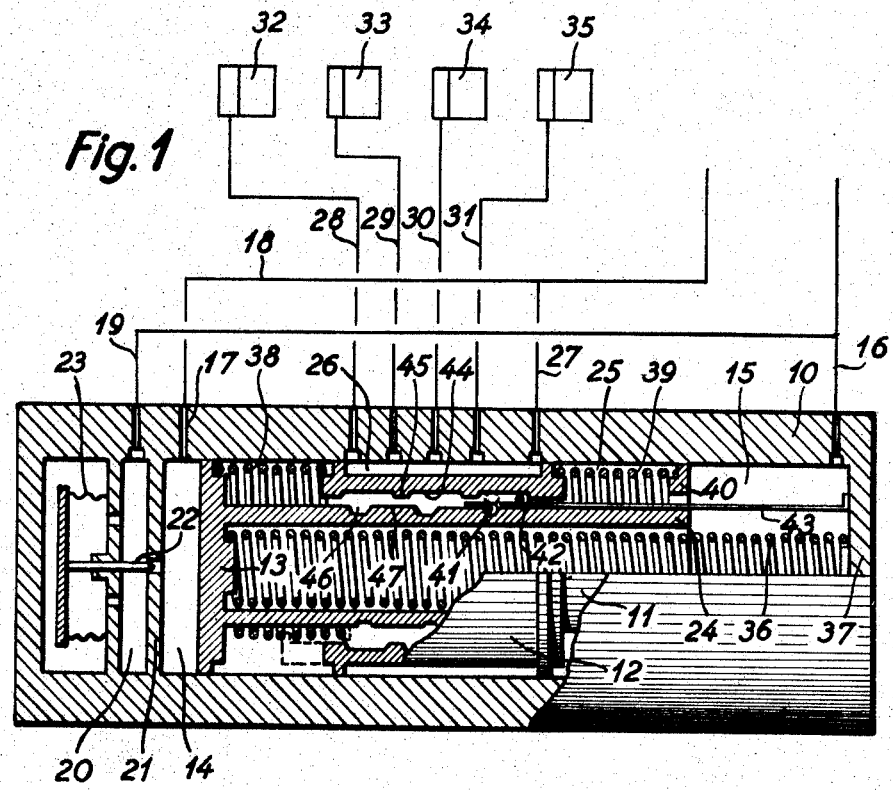
Fig. 1
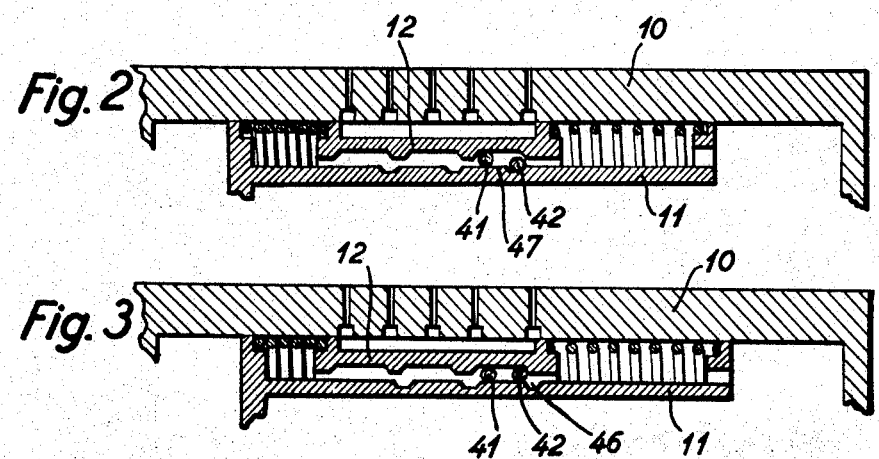
Fig. 2
Fig. 3
INVENTORS.
HANS PETER FREDERIK CHRISTENSEN
VAGN HOVGAARD VILLADSEN
BY
Kurt Kelman
AGENT

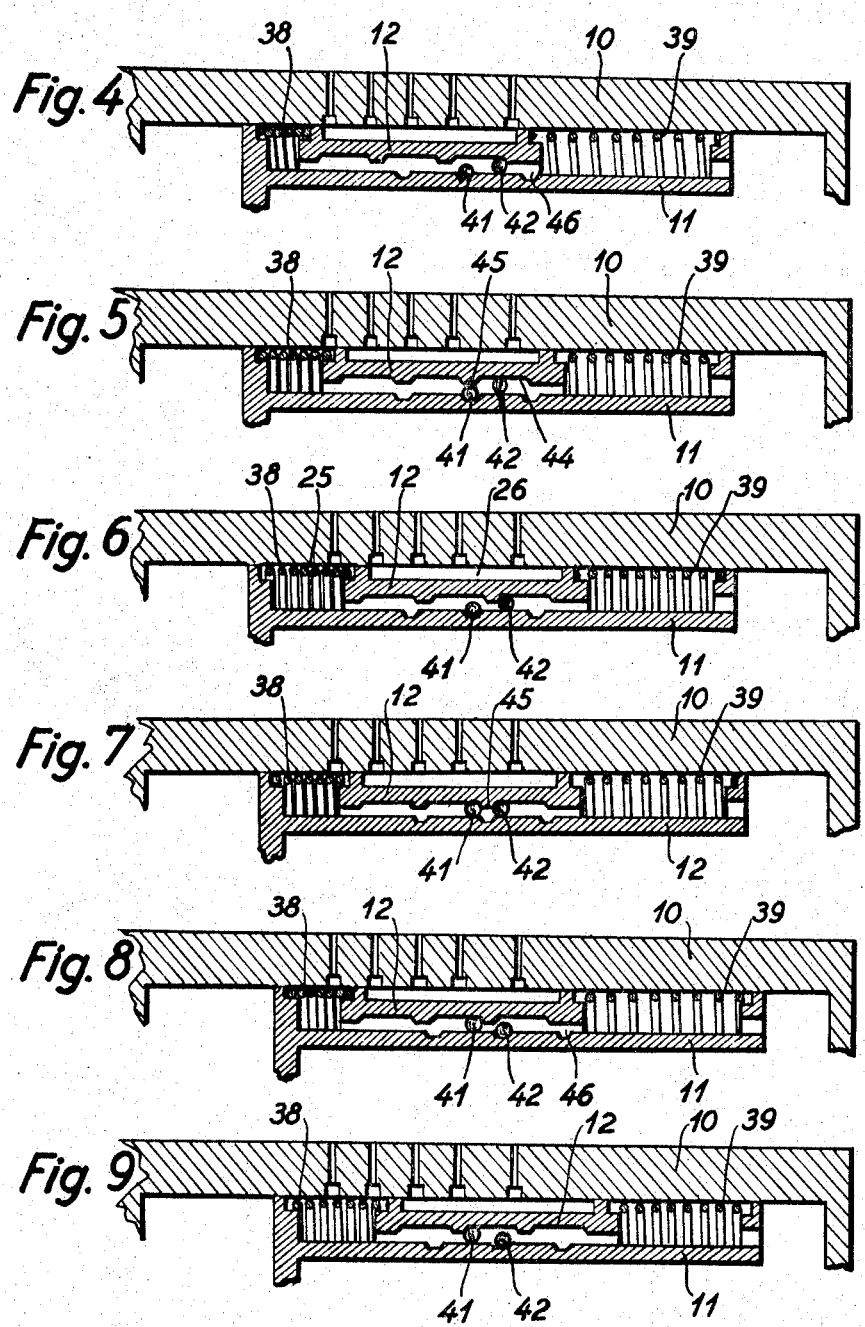

3,335,738
SLIDE CONTROL VALVE FOR REFRIGERATING COMPRESSORS
Hans Peter Frederik Christensen and Vagn Hovgaard Villadsen, Aarhus, Denmark, assignors to Aktieselskabet Thomas Ths. Sabroe & Co., Aarhus, Denmark, a Danish joint-stock company
Filed May 7, 1965, Ser. No. 453,961
Claims priority, application Denmark, June 19, 1964, 3,115/64
5 Claims. (Cl. 137—102)

ABSTRACT OF THE DISCLOSURE

A slide valve for sequentially disconnecting a plurality of conduits from a source of pressure medium and connecting each disconnected conduit to a source of suction, wherein an axially displaceable piston has a slide mounted thereon, the slide has an axially recessed portion bridging a plurality of passages in the valve housing in communication with the conduits and the pressure medium source, two axially stationary slide arresting members are mounted in a clearance between the piston and the slide, lands on the piston and the slide cooperate with the arresting members, and springs normally holding the slide on the piston in a centered position.

Background and summary of the invention

The present invention relates to a slide control valve with a slide that may be sequentially arrested for automatically regulating the performance of a multi-cylindered refrigerating compressor by disconnecting a plurality of conduits leading to a suitable number of cylinders from a source of pressure medium and connecting each disconnected conduit to the suction side of the compressor. The slide is moved by a piston whereon the slide is mounted, and the piston is acted upon by spring power, partly by the suction pressure of the compressor, and partly by a medium pressure dependent on the suction pressure, but greater than the suction pressure. The slide has lands defining at least one groove therebetween for co-operation with slide arresting members, such as balls, which are stationary in relation to the valve housing wherein the piston and slide are mounted for axial displacement.

Such control valves are employed to adapt the effective suction volume of the compressor to the varying cooling requirements in a refrigerating plant, which will cause the pressure on the suction side of the compressor to rise or to fall when the cooling requirements decrease, one or more suction valves of the compressor are put out of operation corresponding to the variation of the suction pressure, and this disengagement must take place quickly in order to avoid damage or unnecessary wear on the regulating members and operating valves. It is, therefore, essential that the movement of the slide is effected as a snap movement.

It is the purpose of the invention to assure not only that the displacement of the slide be restricted to one step at a time, but also to provide a quick and immediate movement of the slide. This is accomplished according to the invention by providing at least two axially spaced slide arresting members held stationary in a clearance between the slide and the piston. At least one land is provided on the piston and on the slide for cooperation with the arresting members. Each land on the slide has an axial extension of such length that the slide may be retained between two axially adjacent stationary arresting members, and each land on the piston has an axial extension of such length that two axially adjacent stationary arresting members may rest thereon. Spring means hold the slide on the piston and bias the slide simultaneously in both directions, and the force of the spring means is so balanced that the slide is held with a recessed portion bridging all the passages to the conduits and the pressure medium source in the absence of axial piston displacement but that this spring force is increased in the direction of piston displacement when the piston is axially displaced.

The piston will be moved only when the suction pressure of the compressor and hence the medium pressure dependent thereon are altered corresponding to a variation in the cooling requirement, while in the first phase the slide is retained by two sets of arresting members one on either side of a land on the slide. When this happens the spring power of the springs inserted between slide and piston increases until the piston has moved so far that the land on the piston has come clear of the one set of arresting members retaining the slide, and this set will be able to release the slide. The release happens suddenly on account of the accumulated spring power, and besides, this power does not have to overcome any friction from the arresting members. Thus, an abrupt and easy displacement of the slide is obtained, until the next set of arresting members positively stops the slide.

The control valve may have two sets of arresting members, preferably balls, maintained at such an axial distance that both sets of arresting members can at the same time lie in any of a plurality of circular grooves in the inner side of the slide, respectively abutting against one side each of the land between two successive grooves; and the cylindrical outer side of the piston facing the slide has a number of circular grooves with such small axial extension that only one set of arresting members can at a time be received therein. The radial dimension of the arresting members substantially corresponds to the radial distance from a land or groove in the slide to a land or groove in the piston, respectively.

Alternatively the arresting members may consist of a plurality of sets of balls equally spaced in axial direction. In this case, the slide has a single land on its inner side and the piston is also provided with a single land. The distance between the two lands is less than the diameter of the balls. In both embodiments the slide will maintain arrested until the piston has been displaced a predetermined distance corresponding to the variation in the requirement for cold, whereafter the slide will be abruptly released and positively stopped in its new position by the arresting members.

Brief description of drawing

The invention will now be explained in detail in the following description with reference to the drawing, in which FIG. 1 schematically and partly in section shows an embodiment of a slide control valve according to the invention, and FIGS. 2–9 show details of the control valve with its parts in different positions.

Detailed description

In the embodiment shown, the slide control valve comprises a valve housing 10 for an axially displaceable piston 11 and an axially displaceable slide 12. The piston has the cylindrical circumference of its piston head 13 in engagement with the wall of the valve housing, so that the latter is divided into two chambers 14 and 15, designated herein as the chamber and the suction pressure chamber, respectively, the latter communicating through a radial bore with conduit 16 leading to the suction side of the compressor, not shown, while a constricted passage 17 (adjustable if desired) connects the pressure chamber 14 with a conduit 18 leading to a source of fluid pressure medium, not shown, which may be the lubricating oil circulation pump of the compressor.

The suction side of the compressor is also, through a conduit 19, connected to a chamber 20, which is separated from the pressure chamber 14 by a wall 21. A port in the wall 21 can be adjustably closed by a needle valve 22, which is enclosed in and mounted on an end plate for a bellows 23. Small ports connect the interior of the bellows through small holes in communication with the chamber 20 wherein the suction pressure of the compressor prevails. By means of springs, not shown, the bellows and the needle valve are adjusted in a suitable manner, so that a sufficient amount of pressure medium escapes through the port of the needle valve to maintain the pressure in the chamber 14. Thus, in case of increasing suction, for example, the pressure difference between the chambers 14 and 20 will increase, but at the same time the bellows will be compressed and thus close the port of needle valve 22, since the cross-section of the bellows is many times greater than that of the needle valve port of needle valve 22, since the cross-section of the bellows pressure in the pressure chamber 14 to be increased and move the piston 11 towards the hand in FIG. 1.

As above mentioned the piston head 13 engages the wall of the valve housing. On the other hand, an annular cavity 25 is provided between the piston skirt 24 and the wall of the valve housing wherein the slide 12 is displaceable in sealing engagement with the valve housing wall. The slide has a reduced diameter portion 26 of such axial length that it may extend over the inlets of a conduit 27 connected to the source of fluid pressure medium, and of conduits 28, 29, 30 and 31 leading to servo motors 32, 33, 34 and 35, each of which may serve one or more of the cylinders of the compressor. In the slide position shown in FIGS. 1 and 2, all the servo motors are supplied with pressure medium, whereby all the suction valves of the compressor are in active position. By displacement of the slide 12 to the right, FIG. 1, the servo motors are gradually disengaged.

A compression spring 36 is inserted in the hollow interior of the piston between the piston head 13 and the end wall 37 of the valve housing. The slide is retained in position in relation to the piston by springs 38 and 39, one resting against the piston head 13, the other against a spring seat 40 attached to the end of the piston skirt. These springs between the slide and the piston would normally only work as resilient abutments in contrast to a conventional control valve arrangement, in which the piston directly abuts against one or the other end of the slide, according to the direction of movement of the piston. However, according to the invention, the springs 38 and 39 are not so much intended as shock absorbers but rather as power accumulation means with a positive purpose in connection with the arresting members. The placing of the springs in a manner similar to buffers at the ends of the slide is shown merely for the sake of convenience. The essential thing is that the springs or spring between the piston and the slide tend to keep the slide in neutral position in relation to the piston, in the absence of other forces.

In the illustrated embodiment, the arresting members consist of two sets of balls 41 and 42, of which is shown a single ball of each set, each set appropriately consisting of three or more balls. The balls 41 and 42 are held against axial displacement by a ball cage 43, which is fastened to the wall 37 of the valve housing and enters the cavity 25 between piston and slide, the spring seat 40 of the piston skirt being arranged to make possible the insertion of the ball cage. Instead of balls, arresting members of different forms can be used, but balls have the advantage that they do not require any definite orientation. It shall also be noted that the ball cage may be fastened in any other way and at any other place than shown.

The depth as well as the length of the grooves and the lands on the slide and the piston are, according to the invention, determined by the axial distance between the ball 41 and the ball 42. The depth of the groove is such, that the radial distance between the bottom of a groove and an opposite land is substantially equal to or just a little larger than the diameter of the ball, while the distance between two opposite lands on the piston and on the slide is smaller than the diameter of the ball, so that a ball cannot pass between two lands. Each groove 44 has a length sufficient to permit the pair of balls 41 and 42 to be received in the groove in either end thereof and between each pair of successive grooves 44, and the intermediate land 45 has such axial length that the balls 41 and 42 can lie close to either side of the land, as shown in FIG. 7. Each groove 46 in the piston 11 is just long enough to receive a single ball 41 or 42, while the land 47 between the pair of successive grooves 46 is so long that both balls 41 and 42 can at the same time rest upon the land, FIG. 3.

In FIG. 1 the piston 11 is in its left hand limit position. When the suction pressure of the compressor decreases, or if in some other way the medium pressure is altered in the chamber 14, for instance thermostatically corresponding to the temperature of the air in a refrigerating chamber, the piston 11 starts moving to the right, whereby the first land 47 on the piston raises the ball 41 up into the first groove 44 in the slide 12, as shown in dotted lines in FIG. 1. As the ball 41 is axially retained, the slide is held against axial movement, even if the other ball 42, during the continued movement of the piston, arrives at and drops down into the first groove 46 in the piston, FIG. 2. By the continued movement of the piston, the ball 42 is again raised from the groove 46, FIG. 3, and thereafter, when the next groove 46 of the piston is opposed to the ball 41, the slide abruptly will be released and quickly slips to the right, as the spring 38 can now be released after having been compressed between the end of the retained slide and the moved piston head 13.

In FIG. 5 the slide 12 is just slipping towards right, and the ball 41 allows the land 45 of the slide to pass while the ball 42 is free to slide or roll in the groove 44 of the slide, until the ball 42, as shown in FIG. 6, reaches the end of the groove and prevents any further movement of the slide, the groove reduced diameter slide portion 26 now being in connection with three servo motors only, whereas the conduit 28 leading to the first servo motor 32 is now in connection with the cavity 25, wherein the suction pressure of the compressor prevails.

In FIG. 7 is shown how the land 45 on the slide 12 is retained between the two balls 41 and 42, if the piston continues its displacement towards the right, until the ball 42, as shown in FIG. 8, slips down in the next groove 46 of the piston and releases the slide, which thereby can move one step further to the position in FIG. 9, where the servo motor 33 has also been disengaged.

The shown embodiment of the sliding control valve according to the invention can, as above mentioned, be altered in different ways in order to obtain the described mode of operation, for instance, instead of using two sets of arresting members and a plurality of ribs and grooves, a greater number of arresting members can be used with only a single land on the slide and a single land on the piston, if the lands are formed as above mentioned in relation to the arresting members.

What we claim is:
1. A slide valve for sequentially disconnecting a plurality of conduits (28–31) from a source of pressure medium and connecting each disconnected one of said conduits to a source of suction, comprising
(a) a valve (10) housing having an axis,
(b) a piston (11) axially displaceable in the valve housing and dividing the housing into two chambers (14, 15),
   (1) the valve housing having an inlet (18) con- necting one (14) of the chambers with the pressure medium source, the pressure from said source acting upon the piston for axially displacing the piston in one direction, and another inlet (16) connecting the other one (15) of the chambers with the suction source, (c) spring means (36) acting upon the piston for axially displacing the piston in a direction opposite the one direction, (d) means (22, 23) for gradually increasing the pressure in the one chamber, (2) the increased pressure axially displacing the piston in the one direction against the bias of the spring means, (e) a slide (12) mounted in the other valve housing chamber for axial displacement with the piston, (3) the slide having an axially extending recessed portion (26), the valve housing having a plurality of axially spaced passages in communication with said plurality of conduits and said pressure medium source, the axial length of the recessed slide portion being sufficient to bridge said passages, and (4) the slide being coaxial with the piston and defining a clearance therewith, (f) two axially spaced slide arresting members (41, 42) held stationary in the clearance, (g) a land (47) on the piston and a land (45) on the slide for cooperation with the arresting members, (5) the land on the slide having an axial extension of such length that the slide may be retained between two axially adjacent ones of the stationary arresting members, and the land on the piston having an axial extension of such length that two axially adjacent ones of the stationary arresting members may rest thereon, and (h) spring means (38, 39) holding the slide on the piston, (6) the spring means biasing the slide simultaneously in the one and in the opposite direction, and the force of the spring means being so balanced that the slide is held with its recessed portion bridging all of said passages in the absence of axial piston displacement but being increased in the direction of the piston displacement when the piston is axially displaced.

2. The slide valve of claim 1, wherein the means for gradually increasing the pressure in the one chamber includes an adjustable valve means (22) connecting the one chamber with the suction source and means (23) for gradually closing the adjustable valve means in response to decreasing suction pressure.

3. The slide valve of claim 1, wherein the arresting members are balls.

4. The slide valve of claim 3, wherein the piston and the slide are cylindrical and the clearance therebetween is annular, the piston and slide having a plurality of lands defining grooves therebetween, the axial spacing of the two arresting members and the axial length of the grooves being such that (a) two arresting members may be selectively received in one of the grooves on the slide while resting on one of the lands on the piston and in two adjacent ones of the grooves on the slide on each side of an intervening one of the lands while resting on two adjacent ones of the lands on the piston, and (b) only one of the arresting members may be received in any one of the grooves on the piston at one time, the radial dimension of the balls corresponding substantially to the distance between the lands on the slide and the piston.

5. The slide valve of claim 3, wherein the piston and the slide are cylindrical and the clearance therebetween is annular, the distance between the lands on the slide and the piston being less than the diameter of the balls.

References Cited

UNITED STATES PATENTS

| | | | |
|---|---|---|---|
| 2,638,265 | 5/1953 | Newton | 230—31 |
| 2,673,025 | 3/1954 | Labus et al. | 230—31 |
| 2,836,345 | 5/1958 | Gerteis | 230—31 |
| 2,973,133 | 2/1961 | Newton | 230—31 |

ROBERT M. WALKER, *Primary Examiner.*

DONLEY J. STOCKING, *Examiner.*

W. L. FREEH, *Assistant Examiner.*